US005958581A

United States Patent [19]
Khanarian et al.

[11] Patent Number: 5,958,581
[45] Date of Patent: Sep. 28, 1999

[54] POLYESTER FILM AND METHODS FOR MAKING SAME

[75] Inventors: Garo Khanarian, Berkeley Heights; Larry F. Charbonneau, Mendham; Carol Kitchens, Bridgewater; Sunny S. Shen, Holmdel, all of N.J.

[73] Assignee: HNA Holdings, Inc., Warren, N.J.

[21] Appl. No.: 09/064,858

[22] Filed: Apr. 23, 1998

[51] Int. Cl.$^6$ .......................... B32B 19/00; C08G 63/66
[52] U.S. Cl. .......................... 428/357; 528/176; 528/190; 528/194; 528/195; 528/198; 528/275; 528/298; 528/300; 528/302; 528/307; 528/308; 528/308.6; 524/81; 524/779; 264/176.1; 264/177.17; 264/211.12; 264/280; 264/291; 264/299; 428/480
[58] Field of Search .................................. 528/176, 190, 528/194, 195, 198, 275, 298, 300, 302, 307, 308, 308.6; 524/81, 779; 264/176.1, 177.17, 211.12, 280, 291, 299; 428/357, 480

[56] References Cited

U.S. PATENT DOCUMENTS

| | | |
|---|---|---|
| 2,985,995 | 5/1961 | Bunting, Jr. et al. . |
| 3,199,281 | 8/1965 | Maerov et al. . |
| 3,684,766 | 8/1972 | Jackson, Jr. et al. . |
| 3,785,993 | 1/1974 | Langhans . |
| 3,795,627 | 3/1974 | Langhans et al. . |
| 3,859,445 | 1/1975 | Langhans . |
| 3,871,947 | 3/1975 | Brekken . |
| 3,966,867 | 6/1976 | Munting . |
| 4,146,663 | 3/1979 | Ikeda et al. . |
| 4,157,419 | 6/1979 | Mirhej . |
| 4,159,617 | 7/1979 | Allan . |
| 4,195,161 | 3/1980 | Davis et al. . |
| 4,209,559 | 6/1980 | Wada et al. . |
| 4,223,128 | 9/1980 | Halek et al. . |
| 4,225,549 | 9/1980 | Allan . |
| 4,231,922 | 11/1980 | Robeson . |
| 4,246,381 | 1/1981 | Robeson . |
| 4,255,301 | 3/1981 | Minagawa et al. . |
| 4,259,458 | 3/1981 | Robeson . |
| 4,259,479 | 3/1981 | Jackson, Jr. et al. . |

(List continued on next page.)

FOREIGN PATENT DOCUMENTS

| | | |
|---|---|---|
| 0 033089A2 | 8/1981 | European Pat. Off. . |
| 0102 596 A2 | 3/1984 | European Pat. Off. . |
| 96/38282 | 12/1996 | European Pat. Off. . |
| 96/38498 | 12/1996 | European Pat. Off. . |
| 97/00284 | 1/1997 | European Pat. Off. . |
| 1263981 | 3/1968 | Germany . |
| 3229412 A1 | 2/1984 | Germany . |
| 4415353 A1 | 11/1994 | Germany . |
| 195 19 577 | 5/1995 | Germany . |
| 195 19 578 | 5/1995 | Germany . |
| 195 28 336 | 8/1995 | Germany . |
| 195 04 913 | 8/1996 | Germany . |
| 195 38 700 | 4/1997 | Germany . |
| 52018832 | 7/1975 | Japan . |
| 1079686 | 8/1967 | United Kingdom . |
| 1354446 | 5/1974 | United Kingdom . |
| 1408036 | 10/1975 | United Kingdom . |

OTHER PUBLICATIONS

Chemical Abstracts vol. 62, col. 10588, Neth. App. 6,405, 497 (1965).
*Encyclopaedic Dictionary of Commercial Polymer Blends*, Ed. L.A. Utracki, ChemTec Publishing, pp. 10–11, 23, 35–43 (1994).
"Plastics processing," *McGraw–Hill Encyclopedia of Science & Technology*, 6$^{th}$ Edition, pp. 35–40 (1987).
"Plastics Processing," *The Way Things Work*, vol. 2, pp. 56–59 (1971).
*Polymer Alloys and Blends:Thermodynamics and Rheology*, Ed. L.A. Utracki, Hanser Publishers, pp. 256–270, 275–280, 287–293, 297–299 (1990).
*Polymeric Materials Encyclopedia*, "Polyesters (Derived from Renewable Sources)" vol. 8, pp. 5891–5896, CPC Press, Inc. (1996).
Dietrich Braun and Matthias Bergmann "1,4:3,6–Dianhydrohexite als Bausteine Für Polymere" J. prakt. Chem. 334, pp. 298–310 (1992).
Hans R. Kricheldorf, "'Sugar Diols' as Building Blocks of Polycondensates," J.M.S.—Rev. Macromol. Chem. Phys., C37(4), pp. 599–631 (1997).
Reinhard Storbeck, Matthias Rehahn and Matthias Ballauff, "*Synthesis and properties of high–molecular–weight polyesters based on 1,4:3,6–dianhydrohexitols and terephthalic acid*," Makromol. Chem. 194, pp. 53–64 (1993).
Reinhard Storbeck, "Synthese und Charakterisierung von Polyestern auf Basis nachwachsender Rohstoffe," Dissertation, Universität Karlsruhe, 1994.
Reinhard Storbeck and Matthias Ballauff, "Synthesis and Thermal Analysis of Copolyesters Deriving from 1,4:3, 6–Dianhydrosorbitol, Ethylene Glycol, and Terephthalic Acid," Journal of Applied Polymer Science, vol. 59, pp. 1199–1202 (1996).
D. Braun et al., "Polyesters with 1.4:3.6–dianhydrosorbitol as polymeric plasticizers for PVC," Die Angewandte Makromolekulare Chemie 199, pp. 191–205 (1992).
D. Braun et al., "Grafting of polyesters by free–radical chain transfer," Die Angewandte Makromolekulare Chemie 210, pp. 173–196 (1993).
Estelle Cognet–Georjon et al., "New polyurethanes based on diphenylmethane diisocyanate and 1,4:3,6–dianhydrosorbitol, 1," Macromol. Chem. Phys. 196, pp. 3733–3751 (1995).

(List continued on next page.)

Primary Examiner—Samuel A. Acquah
Attorney, Agent, or Firm—Burns, Doane, Swecker & Mathis, L.L.P.

[57] ABSTRACT

A polyester film made from a polymer having ethylene glycol moieties, isosorbide moieties and terepthaloyl moieties, and the method of making the film is described. The polyester film is used to form articles such as films, lacquers, labels, capacitors, insulators, and the like, and has an inherent viscosity of at least 0.35 dL/g when measured as a 1% (weight/volume) solution of the polyester in o-chlorophenol at a temperature of 25° C.

41 Claims, No Drawings

U.S. PATENT DOCUMENTS

| | | |
|---|---|---|
| 4,294,956 | 10/1981 | Berger et al. |
| 4,294,957 | 10/1981 | Berger et al. |
| 4,351,917 | 9/1982 | Calundann et al. |
| 4,352,927 | 10/1982 | Cogswell et al. |
| 4,355,080 | 10/1982 | Zannucci. |
| 4,374,239 | 2/1983 | Berger et al. |
| 4,383,051 | 5/1983 | Meyborg et al. |
| 4,383,923 | 5/1983 | Elfert. |
| 4,386,186 | 5/1983 | Maresca et al. |
| 4,408,061 | 10/1983 | Salzburg et al. |
| 4,413,116 | 11/1983 | Reuter et al. |
| 4,418,174 | 11/1983 | Dhein et al. |
| 4,435,562 | 3/1984 | Sullivan et al. |
| 4,438,226 | 3/1984 | Dirlikov et al. |
| 4,439,586 | 3/1984 | Kawakami et al. |
| 4,443,563 | 4/1984 | Dirlikov et al. |
| 4,456,729 | 6/1984 | Dhein et al. |
| 4,474,918 | 10/1984 | Seymour et al. |
| 4,506,066 | 3/1985 | Medem et al. |
| 4,506,086 | 3/1985 | Salzburg et al. |
| 4,526,923 | 7/1985 | Hornbaker et al. |
| 4,551,520 | 11/1985 | Morris et al. |
| 4,557,982 | 12/1985 | Nouda et al. |
| 4,564,645 | 1/1986 | Salzburg et al. |
| 4,587,071 | 5/1986 | Minami et al. |
| 4,605,729 | 8/1986 | Barnes et al. |
| 4,663,415 | 5/1987 | Grögler et al. |
| 4,687,830 | 8/1987 | Weber et al. |
| 4,713,436 | 12/1987 | Downs et al. |
| 4,725,647 | 2/1988 | Maresca et al. |
| 4,805,788 | 2/1989 | Akiho. |
| 4,814,426 | 3/1989 | Utsumi et al. |
| 4,863,046 | 9/1989 | Collette et al. |
| 4,993,566 | 2/1991 | Eberle. |
| 4,993,567 | 2/1991 | Eberle, Jr. |
| 5,005,716 | 4/1991 | Eberle. |
| 5,021,289 | 6/1991 | Light et al. |
| 5,108,675 | 4/1992 | Matsuo et al. |
| 5,120,822 | 6/1992 | Hoeschele et al. |
| 5,124,388 | 6/1992 | Pruett et al. |
| 5,141,120 | 8/1992 | Brown et al. |
| 5,141,121 | 8/1992 | Brown et al. |
| 5,153,302 | 10/1992 | Masuda et al. |
| 5,164,478 | 11/1992 | Lee et al. |
| 5,179,143 | 1/1993 | König et al. |
| 5,296,550 | 3/1994 | Natarajan et al. |
| 5,321,056 | 6/1994 | Carson et al. |
| 5,382,474 | 1/1995 | Adhya et al. |
| 5,409,967 | 4/1995 | Carson et al. |
| 5,412,005 | 5/1995 | Bastioli et al. |
| 5,484,632 | 1/1996 | Mercer, Jr. et al. |
| 5,496,887 | 3/1996 | Braune. |
| 5,596,888 | 1/1997 | McLarty, III et al. |
| 5,607,757 | 3/1997 | Dalton. |
| 5,616,404 | 4/1997 | Sublett. |
| 5,646,236 | 7/1997 | Schafheutle et al. |
| 5,648,152 | 7/1997 | Diaz-Lotti et al. |
| 5,654,083 | 8/1997 | Venema. |
| 5,656,719 | 8/1997 | Stibal et al. |
| 5,709,929 | 1/1998 | Venema. |
| 5,721,397 | 2/1998 | Weinberg. |
| 5,747,175 | 5/1998 | Dietz et al. |
| 5,766,679 | 6/1998 | Siemensmeyer et al. |

OTHER PUBLICATIONS

Estelle Cognet–Georjon et al., "New polyurethanes based on 4,4'–diphenylmethane diisocyanate and 1,4:3,6 dianhydrosorbitol, $2^{a)n}$"Macromol. Chem. Phys. 197, pp. 3593–3612 (1996).

Hans R. Kricheldorf et al., "Chiral thermotropic copoly(ester–imide)s based on isosorbibe $^{b)}$ and N–(4–carboxyphenyl)trimellitimide," Macromol. Rapid Commun. 16, pp. 231–237 (1995).

Hans R. Kricheldorf et al., "New Polymer Syntheses. LXXXII. Syntheses of Poly(ether–sulfone)s from Silylated Aliphatic Diols Including Chiral Monomers," Journal of Polymer Science: Part A: Polymer Chemistry, vol. 33, pp. 2667–2671 (1995).

Hans R. Kricheldorf et al., "LC–polyimides 26. Photoreactive, nematic or cholesteric poly(ester–imide)s derived from 4–aminocinnamic acid trimellitimide, isosorbide and various diphenols," High Perform. Polym., 7, pp. 471–480 (1995).

Hans R. Kricheldorf et al., "Cholesteric and photoreactive polyesters," Reactive & Functional Polymers, 30, pp. 173–189 (1996).

Mustapha Majdoub et al., Nouveaux Polyéthers Et Polyesters À Base D'Isosorbide: Synthèse Et Caractérisation, Eur. Polym. J., vol. 30, No. 12, pp. 1431–1437 (1994).

Masahiko Okada et al., "Synthesis and biodegradability of polyesters based on 1,4:3,6–dianhydrohexitols and sucinic acid derivatives," in *Biodegradable Plastics and Polymers*, Eds. Y. Doi and K. Fukada, Elsevier Science B.V., pp. 511–518 (1994).

Masahiko Okada et al., "Synthesis and Degradabilities of Polyesters from 1,4:3,6–Dianhydrohexitols and Aliphatic Dicarboxylic Acids," Journal of Polymer Science: Part A: Polymer Chemistry, vol. 33, pp. 2813–2820 (1995).

Masahiko Okada et al., "Biodegradable Polymers Based on Renewable Resources: Polyesters Composed of 1,4:3,6–Dianhydrohexitol and Aliphatic Dicarboxylic Acid Units," Journal of Applied Polymer Science, vol. 62, pp. 2257–2265 (1996).

Martin Reinecke and Helmut Ritter, "Branching and crosslinking of an unsaturated oligoester with furfurylamides and sorbic acid amides via Diels–Alder additions," Makromol. Chem. 194 pp. 2385–2393 (1993).

Joachim Thiem et al., "Synthesis of Polyterephthalates Derived from Dianhydrohexitols," Polymer Bulletin 11, pp. 365–369 (1984).

J. Thiem et al., "Darstellung und gezielte Polykondensation von Anhydroalditol–Bausteinen aus Stärke", starch/stärke, 36, Nr.5, pp. 170–176 (1984).

Sirinat Wilbullucksanakul et al., "Synthesis of polyurethanes from saccharide–derived diols and diisocyantes and their hydrolyzability," Macromol. Chem., Phys. 197, pp. 135–146 (1996).

V.L. Lapenkov et al., "Polyvinyl ethers of dianhvdro derivatives of mannitol and sorbitol," Ref. Zh., Khim. 1973, Abstr. No. 15S298.

Stanislaw Ropuszynski et al., "Preparation of oxyethylene derivatives of esters of dianhydroglucitol and some higher fatty acids and study of their properties," Abstract; Pr. Nauk. Inst. Technol. Org. Tworzyw Sztucznych Politech. Wroclaw., No. 3, pp. 15–38 (1971) with Abstract.

POLYESTER FILM AND METHODS FOR MAKING SAME

RELATED APPLICATIONS

The following copending applications, filed on even date herewith, contain related subject matter: U.S. application Ser. Nos. 09/064,844, 09/086,064, 09/064,846, 09/064,826, 09/064,719, 09/064,862 and 09/064,720. The content of the above-identified applications are hereby incorporated by reference.

FIELD OF THE DISCLOSURE

This disclosure relates to a film formed from a polyester, methods of making the polyester and film, and articles made from the film. More specifically, this disclosure relates to films made from a polyester having an isosorbide moiety, terephthaloyl moiety and ethylene glycol moiety, methods of making the same, and articles made therefrom.

BACKGROUND OF THE DISCLOSURE

Polymeric films have a variety of uses, such as in packaging, especially of foodstuffs, adhesive tapes, insulators, capacitors, photographic development, x-ray development and as laminates, for example. For many of these uses, the heat resistance of the film is an important factor. Therefore, a higher melting point and glass transition temperature ($T_g$) are desirable to provide better heat resistance and more stable electric characteristics. Further, it is desired that these films have good tensile strength and a high elongation at break.

Various polymeric compositions have been used in an attempt to meet all of the above criteria. In particular, poly(ethylene terephthalate) (PET), is preferred for its glass transition temperature, tensile strength and low cost. However, there are still problems achieving a product having the desired crystallinity and strength, as well as other desirable characteristics such as high optical clarity and resistance to weathering, for example. Various polymeric blends have been proposed, but none are completely satisfactory.

Thus, a need exists for new materials suitable for manufacture of polymeric films that offer desirable glass transition temperatures, suitable tensile strength, desirable crystallinity, high optical density, resistance to weathering and low cost.

The diol 1,4:3,6-dianhydro-D-sorbitol, referred to hereinafter as isosorbide, the structure of which is illustrated below, is readily made from renewable resources, such as sugars and starches. For example, isosorbide can be made from D-glucose by hydrogenation followed by acid-catalyzed dehydration.

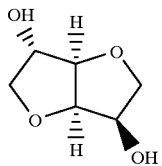

Isosorbide has been incorporated as a monomer into polyesters that also include terephthaloyl moieties. See, for example, R. Storbeck et al, *Makromol. Chem.,* Vol. 194, pp. 53–64 (1993); R. Storbeck et al, *Polymer,* Vol. 34, p. 5003 (1993). However, it is generally believed that secondary alcohols such as isosorbide have poor reactivity and are sensitive to acid-catalyzed reactions. See, for example, D. Braun et al., *J. Prakt.Chem.,* Vol. 334, pp. 298–310 (1992). As a result of the poor reactivity, polyesters made with an isosorbide monomer and esters of terephthalic acid are expected to have a relatively low molecular weight. Ballauff et al, Polyesters (Derived from Renewable Sources), Polymeric Materials Encyclopedia, Vol. 8, p. 5892 (1996).

Copolymers containing isosorbide moieties, ethylene glycol moieties, and terephthaloyl moieties have been reported only rarely. A copolymer containing these three moieties, in which the mole ratio of ethylene glycol to isosorbide was about 90:10, was reported in published German Patent Application No. 1,263,981 (1968). The polymer was used as a minor component (about 10%) of a blend with polypropylene to improve the dyeability of polypropylene fiber. It was made by melt polymerization of dimethyl terephthalate, ethylene glycol, and isosorbide, but the conditions, which were described only in general terms in the publication, would not have given a polymer having a high molecular weight.

Copolymers of these same three monomers were described again recently, where it was observed that the glass transition temperature ($T_g$) of the copolymer increases with isosorbide monomer content up to about 200° C. for the isosorbide terephthalate homopolymer. The polymer samples were made by reacting terephthaloyl dichloride in solution with the diol monomers. This method yielded a copolymer with a molecular weight that is apparently higher than was obtained in the German Patent Application described above, but still relatively low when compared against other polyester polymers and copolymers. Further, these polymers were made by solution polymerization and were thus free of diethylene glycol moieties as a product of polymerization. See R. Storbeck, Dissertation, Universität Karlsruhe (1994); R. Storbeck, et al., *J. Appl. Polymer Science,* Vol. 59, pp. 1199–1202 (1996).

U.S. Pat. No. 4,418,174 describes a process for the preparation of polyesters useful as raw materials in the production of aqueous stoving lacquers. The polyesters are prepared with an alcohol and an acid. One of the many preferred alcohols is dianhydrosorbitol. However, the average molecular weight of the polyesters is from 1,000 to 10,000, and no polyester actually containing a dianhydrosorbitol moiety was made.

U.S. Pat. No. 5,179,143 describes a process for the preparation of compression molded materials. Also, described therein are hydroxyl containing polyesters. These hydroxyl containing polyesters are listed to include polyhydric alcohols, including 1,4:3,6-dianhydrosorbitol. Again, however, the highest molecular weights reported are relatively low, i.e., 400 to 10,000, and no polyester actually containing the 1,4:3,6-dianhydrosorbitol moiety was made.

Published PCT applications WO 97/14739 and WO 96/25449 describe cholesteric and nematic liquid crystalline polyesters that include isosorbide moieties as monomer units. Such polyesters have relatively low molecular weights and are not isotropic.

SUMMARY OF THE DISCLOSURE

Contrary to the teachings and expectations that have been published in the prior art, isotropic, i.e., semi-crystalline and amorphous or non-liquid crystalline, copolyesters containing terephthaloyl moieties, ethylene glycol moieties, isosorbide moieties and, optionally, diethylene glycol moieties, are readily synthesized in molecular weights that are suitable for making fabricated products such as films on an industrial scale.

The process conditions for producing the polyester film, particularly the amounts of monomers used in the polyester, are desirably chosen so that the final polymeric product used for manufacturing the film contains the desired amounts of the various monomer units, preferably with equimolar amounts of monomer units derived from a diol and a diacid. Because of the volatility of some of the monomers, including isosorbide, and depending on the method of manufacturing the polyester, some of the monomers are desirably included in excess at the beginning of the polymerization reaction and removed as the reaction proceeds. This is particularly true of ethylene glycol and isosorbide.

The polyester may be formed by any method known in the art. Preferably, however, the polyester is formed by solvent or melt polymerization. The choice of method may be determined by the desired amount of diethylene glycol in the final product.

In a preferred embodiment, the number of terephthaloyl moieties in the polymer is in the range of about 25% to about 50 mole % (mole % of the total polymer). The polymer may also include amounts of one or more other aromatic diacid moieties such as, for example, those derived from isophthalic acid, 2,5-furandicarboxylic acid, 2,5-thiophenedicarboxylic acid, 2,6-naphthalenedicarboxylic acid, 2,7-naphthalenedicarboxylic acid, and 4,4'-bibenzoic acid, at combined levels up to about 25 mole % (mole % of the total polymer).

In a preferred embodiment, ethylene glycol monomer units are present in amounts of about 5 mole % to about 49.75 mole %. The polymer may also contain diethylene glycol moieties. Depending on the method of manufacture, the amount of diethylene glycol moieties is in the range of about 0.0 mole % to about 25 mole %.

In a preferred embodiment, isosorbide is present in the polymer in amounts in the range of about 0.25 mole % to about 40 mole %. One or more other diol monomer units may also be included in amounts up to a total of about 45 mole %.

The polyester has an inherent viscosity, which is an indicator of molecular weight, of at least about 0.35 dL/g, as measured on a 1% (weight/volume) solution of the polymer in o-chlorophenol at a temperature of 25° C. A higher inherent viscosity, such as at least about 0.40 dL/g, preferably at least about 0.50 dL/g, is desired for optimal film formation. Further processing of the polyester may achieve even higher inherent viscosities, such as over 1.0 dL/g.

The polyester films of the present invention are made by any method known in the art and are suitable for use in a variety of applications, such as food packaging, labels, photograph or x-ray development, insulators, capacitors, various tapes, and the like. These films provide a high temperature resistance and increased strength over other commonly used film forming materials, such as poly (ethylene terephthalate) PET.

DETAILED DESCRIPTION OF THE PREFERRED EMBODIMENTS OF THE DISCLOSURE

The isotropic polyester film and a method of manufacturing the same are described in detail below. In particular, a method of manufacturing the polyester comprising terephthaloyl moieties, ethylene glycol moieties and isosorbide moieties is described, as well as the process of forming films from such a polymer.

In a preferred embodiment, ethylene glycol monomer units are present in the polymer in amounts of about 33 mole % to about 49.9 mole %, preferably 37 mole % to about 45 mole %, although higher amounts may be included as necessary to achieve the desired results. The polymer composition may also contain diethylene glycol monomer units. Depending on the method of manufacture, the amount of diethylene glycol monomer units is in the range of from about 0.0 mole % to about 5.0 mole %, preferably 0.25 mole % to about 5.0 mole %, although higher amounts may be included as necessary to achieve the desired results. Diethylene glycol may be produced as a by-product of the polymerization process, or may be added directly to the composition to help accurately regulate the amount of diethylene glycol monomer units that are in the polymer.

In preferred embodiments, isosorbide moieties are present in the polymer in amounts in the range of from about 0.25 mole % to about 30 mole %, preferably about 0.25 mole % to about 20 mole %, more preferably about 0.25 mole % to about 12.0 mole %, and most preferably from about 1.0 mole % to about 6.0 mole %, although higher amounts may be included as necessary to achieve the desired results. One or more other diol monomer units may optionally be included in amounts up to a total of about 2.0 mole %, but preferably less than 1.0 mole %. The amount of other diols included may however be higher as necessary to achieve the desired results. Examples of the optional other diol units include aliphatic alkylene glycols having from 3–12 carbon atoms and having the empirical formula HO—$C_nH_{2n}$—OH, where n is an integer from 3–12, including branched diols such as 2,2-dimethyl-1,3-propanediol; cis or trans-1,4-cyclohexanedimethanol and mixtures of the cis and trans isomers; triethylene glycol; 2,2-bis[4-(2-hydroxyethoxy) phenyl] propane; 1,1-bis[4-(2-hydroxyethoxy) phenyl]-cyclohexane; 9,9-bis[4-(2-hydroxyethoxy) phenyl]fluorene; 1,4:3,6-dianhydromannitol; 1,4:3,6-dianhydroiditol; and 1,4-anhydroerythritol.

Terephthaloyl moieties in the polyester may range from 25–50 mole %, but are preferably in the range of from about 40–50 mole %, although higher amounts may be included as necessary to achieve the desired results. Other aromatic diacid moieties in the polymer, if desired, may include, for example, those derived from isophthalic acid, 2,5-furandicarboxylic acid, 2,5-thiophenedicarboxylic acid, 2,6-naphthalenedicarboxylic acid, 2,7-naphthalenedicarboxylic acid, and 4,4'-bibenzoic acid, at combined levels up to about 10 mole %, preferably between 0.01 and 5 mole % of the total polymer, although higher amounts may be included as necessary to achieve the desired results.

It is preferable that equimolar amounts of diacid monomer units and diol monomer units are present in the polymer in order to achieve a high molecular weight and high inherent viscosity, which provide a lower shrinkage rate and higher glass transition temperature ($T_g$) than, for example, poly (ethylene terephthalate). The polyester formed has an inherent viscosity, which is an indicator of molecular weight, of at least about 0.35 dL/g, as measured on a 1% (weight/volume) solution of the polymer in o-chlorophenol at a temperature of 25° C. Preferably, the inherent viscosity is at least about 0.40 dL/g, and preferably at least about 0.45 dL/g, and may be as high as 2.0 dL/g, or even higher. Most preferably, an inherent viscosity of about 0.5–0.7 dL/g is desired.

The molecular weight is normally not measured directly. Instead, the inherent viscosity of the polymer in solution or the melt viscosity is used as an indicator of molecular weight. For the present polymers, the inherent viscosity is measured by the method described previously, with a molecular weight corresponding to an inherent viscosity of about 0.35 dL/g or more. Higher molecular weights corresponding to inherent viscosities of at least about 0.45 dL/g are preferred, and molecular weights corresponding to inherent viscosities as high as about 1.0 dL/g to 2.0 dL/g or even higher may be obtained if desired. Generally the inherent viscosity/molecular weight relationship can be fitted to the linear equation:

$$\log (IV) = 0.586 \times \log (M_W) - 2.9672.$$

The inherent viscosities are a better indicator of molecular weight for comparisons of samples and are used as the indicator of molecular weight herein.

The polyesters used to make the films of the invention can be made by any of several methods. The product compositions vary somewhat depending on the method used, particularly in the amount of diethylene glycol residue that is present in the polymer. These methods include the reaction of the diol monomers with the acid chlorides of terephthalic acid and any other acids that may be present. The reaction of terephthaloyl dichloride with isosorbide and ethylene glycol is readily carried out by combining the monomers in a solvent (e.g. toluene) in the presence of a base, such as pyridine, which neutralizes HCl as it is produced. This procedure is described in R. Storbeck et al., *J. Appl. Polymer Science*, Vol. 59, pp. 1199–1202 (1996). Other well-known variations using terephthaloyl dichloride may also be used (e.g. interfacial polymerization), or the monomers may simply be stirred together while heating.

When the polymer is made using the acid chlorides, the ratio of monomer units in the product polymer is about the same as the ratio of reacting monomers. Therefore, the ratio of monomers charged to the reactor is about the same as the desired ratio in the product. A stoichiometric equivalent of the diol and diacids generally will be used to obtain a high molecular weight polymer, e.g., one with an inherent viscosity of at least about 0.35 dL/g, suitable for making films.

The polymers can also be made by a melt polymerization process, in which the acid component is either terephthalic acid or dimethyl terephthlate, and also may include the free acid or dimethyl ester of any other aromatic diacids that may be desired in the polyester polymer composition. The diacids or dimethyl esters are heated with the diols (ethylene glycol, isosorbide, optional diols) in the presence of a catalyst to a high enough temperature that the monomers combine to form esters and diesters, then oligomers, and finally polymers. The polymeric product at the end of the polymerization process is a molten polymer. The diol monomers (e.g., ethylene glycol and isosorbide) are volatile and distill from the reactor as the polymerization proceeds. Therefore, an excess of these diols is desirably charged to the reaction to obtain a polymer, and the amounts must be adjusted according to the characteristics of the polymerization vessel, such as the efficiency of the distillation column and the efficiency of monomer recovery and recycle. Such modifications in the amounts of monomers and the like in accordance with the characteristics of a reactor are readily made by skilled practitioners. Further, a skilled practioner can readily determine the amount of each component desirably charged to any particular reactor to form the polymer of the invention.

The above described melt polymerization process is the preferred method of making the polymer and is described in detail in copending commonly assigned U.S. application Ser. No. 09/064,844, incorporated herein by reference. The melt polymerization processes using dimethyl terephthalate and terephthalic acid are also summarized below.

DIMETHYL TEREPHTHALATE PROCESS

In this process, which is carried out in two stages, terephthalic acid and the optional diacid monomers, if present, are used as their dimethyl ester derivatives. The diols (e.g., ethylene glycol and isosorbide) are mixed with the dimethyl ester of the aromatic diacid (e.g., dimethyl terephthalate) in the presence of an ester interchange catalyst, which causes exchange of the ethylene glycol for the methyl group of the dimethyl esters through a transesterification reaction. This results in the formation of methanol, which distills out of the reaction flask, and bis(2-hydroxyethylterephthalate). Because of the stoichiometry of this reaction, somewhat more than two moles of ethylene glycol are desirably added as reactants for the ester interchange reaction.

Catalysts that bring about ester interchange include salts (usually acetates) of the following metals: Li, Ca, Mg, Mn, Zn, Pb, and combinations thereof, $Ti(OR)_4$, where R is an alkyl group having 2–12 carbon atoms, and PbO. The catalyst components are generally included in an amount of about 10 ppm to about 100 ppm. Preferred catalysts for ester interchange include $Mn(OAc)_2$, $Co(OAc)_2$, and $Zn(OAc)_2$, where OAc is the abbreviation for acetate, and combinations thereof. The polycondensation catalyst used in the second stage of the reaction, preferably Sb(III) oxide, may be added now or at the start of the polycondensation stage. A catalyst that has been used with particularly good success is based on salts of Mn(II) and Co(II), used in the amount of from about 50 ppm to about 100 ppm each. These are preferably used in the form of Mn(II) acetate tetrahydrate and Co(II) acetate tetrahydrate, although other salts of the same metals may also be used.

Ester interchange is desirably brought about by heating and stirring the mixture of reactants under an inert atmosphere (e.g. nitrogen) at atmospheric pressure from room temperature to a temperature high enough to induce the ester interchange (about 150° C.). Methanol is formed as a by-product and distills out of the reactor. The reaction is gradually heated to about 250° C. until methanol evolution stops. The end of methanol evolution can be recognized by a drop in the overhead temperature of the reaction vessel.

A small amount of an additive having a boiling point of 170–240° C. may be added to the ester interchange to aid in the heat transfer within the reaction medium and to help retain volatile components in the vessel that may sublime into the packed column. The additive must be inert and not react with alcohols or dimethyl terephthalate at temperatures below 300° C. Preferably, the additive has a boiling point greater than 170° C., more preferably within the range of 170° C. to 240° C., and is used in an amount between about 0.05 and 10 wt %, more preferably between about 0.25 and 1 wt % of the reaction mixture. A preferred additive is tetrahydronaphthalene. Other examples include diphenyl ether, diphenyl sulfone and benzophenone. Other such solvents are described in U.S. Pat. No. 4,294,956, the contents of which are hereby incorporated by reference.

The second stage of the reaction is commenced by adding a polycondensation catalyst if it was not added at the beginning of the process, and a sequestering agent for the transesterification catalyst. Polyphosphoric acid is an example of a sequestering agent and is normally added in an amount of about 10 to about 100 ppm of phosphorous per gram of dimethyl terephthalate. An example of a polycondensation catalyst is antimony (III) oxide, which may be used at a level of 100 to about 400 ppm.

The polycondensation reaction is typically carried out at a temperature from about 250° C. to 285° C. During this time, ethylene glycol distills out of the reaction due to condensation of the bis(2-hydroxyethyl) terephthalate to form polymer and by-product ethylene glycol, which is collected as a distillate.

The polycondensation reaction described above is preferably carried out under vacuum, which can be applied while the reactor is being heated to the temperature of the polycondensation reaction after polyphosphoric acid and Sb(III) oxide have been added. Alternatively, vacuum can be applied after the polycondensation reaction temperature reaches 280° C.–285° C. In either case, the reaction is accelerated by the application of vacuum. Heating under vacuum is continued until the molten polymer reaches the desired molecular weight, usually recognized by an increase in the melt viscosity to a pre-determined level. This is observed as an increase in the torque needed for the stirring motor to maintain stirring at a constant rpm. An inherent viscosity of at least 0.5 dL/g, and generally up to about 0.65 dL/g or greater, can be achieved by this melt polymerization process without further efforts at raising molecular weight. For certain composition ranges, the molecular weight can be increased further by solid state polymerization, described below.

TEREPHTHALIC ACID PROCESS

The terephthalic acid process is similar to the dimethyl terephthalate process except that the initial esterification reaction that leads to bis(2-hydroxyethylterephthalate) and other low molecular weight esters is carried out at a slightly elevated pressure (autogenous pressure, about 25 to 50 psig). Instead of a two-fold excess of diols, a smaller excess (about 10% to about 60%) of diols (ethylene glycol, isosorbide and other diols, if any) is used. The intermediate esterification product is a mixture of oligomers, because not enough diol is present to generate a diester of terephthalic acid. The catalysts are also different. No added catalyst is necessary in the esterification reaction.

A polycondensation catalyst (e.g., Sb(III) or Ti(IV) salts) is still desirable to achieve a high molecular weight polymer. The catalyst that is needed to achieve a high molecular weight can be added after the esterification reaction, or it can be conveniently charged with the reactants at the beginning of the reaction. Catalysts that are useful for making a high molecular weight polymer directly from terephthalic acid and the diols include the acetate or other alkanoate salts of Co(II) and Sb(III), oxides of Sb(III) and Ge(IV), and Ti(OR)$_4$ (where R is an alkyl group having 2 to 12 carbon atoms), as well as glycol solubilized metal oxides. The use of these and other catalysts in the preparation of polyesters is well known in the art.

The reaction may be carried out in discrete steps, but this is not necessary. In practice on a large scale, it may be carried out in steps as the reactants and intermediate products are pumped from reactor to reactor at increasing temperatures. In a batch process, the reactants and catalyst may be charged to a reactor at room temperature and then gradually heated to about 285° C. as the polymer forms. The pressure is vented in the range of about 200° C. to about 250° C., and a vacuum is then desirably applied.

Esterification to form bis(2-hydroxyethylterephthalate) esters and oligomers takes place at elevated temperatures (between room temperature and about 220° C. to 265° C. under autogenous pressure), and the polymer is made at temperatures in the range of about 275° C. to about 285° C. under a high vacuum (less than 10 Torr, preferably less than 1 Torr). The vacuum is needed to remove residual ethylene glycol and water vapor from the reaction to raise the molecular weight.

A polymer having an inherent viscosity of at least 0.5 dL/g, and generally up to about 0.65 dL/g, can be achieved by the direct polymerization process, without subsequent solid state polymerization. The progress of the polymerization can be followed by the melt viscosity, which is easily observed by the torque that is required to maintain stirring of the molten polymer.

SOLID STATE POLYMERIZATION

Polymers can not be made by the melt condensation process described above having an inherent viscosity of at least about 0.50 dL/g, and often as high as about 0.65 dL/g or greater, without further treatment. Compositions of ethylene glycol, isosorbide, and terephthalic acid having isosorbide in an amount of about 0.25% to about 10% on a mole basis may have their molecular weight increased further by solid state polymerization. The product made by melt polymerization, after extruding, cooling, and pelletizing, is essentially non-crystalline. The material can be made semi-crystalline by heating it to a temperature in the range of about 115° C. to about 140° C. for an extended period of time (about 2 to about 12 hours). This induces crystallization so that the product can then be heated to a much higher temperature to raise the molecular weight. The freshly extruded product gets sticky if it is heated above about 140° C. before it has crystallized, making solid state polymerization impossible without the pre-crystallization heating step. The process works best for low levels of isosorbide, from about 0.25 mole % to about 3 mole %, because the polyester crystallizes more easily with low levels of isosorbide.

The polymer may also be crystallized prior to solid state polymerization by treatment with a relatively poor solvent for polyesters, such as acetone, which induces crystallization. Such solvents reduce the glass transition temperature T($_g$), allowing for crystallization. Solvent induced crystallization is known for polyesters and is described in U.S. Pat. Nos. 5,164,478 and 3,684,766, which are hereby incorporated by reference.

The crystallized polymer is subjected to solid state polymerization by placing the pelletized or pulverized polymer into a stream of an inert gas, usually nitrogen, or under a vacuum of 1 Torr, at an elevated temperature, above about 140° C. but below the melting temperature of the polymer, for a period of from about 2 to 16 hours. Solid state polymerization is generally carried out at a temperature in the range of from about 190° to about 210° C. for a period of from about 2 to about 16 hours. Good results are obtained by heating the polymer to about 195° to about 198° C. for about 10 hours. This solid state polymerization may raise the inherent viscosity to about 0.8 dL/g or higher.

FILM FORMING PROCESS

The polyester polymer formed by one of the above methods, or by any other method known in the art, may be formed into a film for use in any one of many different applications, such as food packaging, labels, dielectric insulation, a water vapor barrier or the like. The monomer composition of the polyester polymer is preferably chosen to result in a partially crystalline polymer desirable for the formation of film, wherein the crystallinity provides strength and elasticity. As first produced, the polyester is generally semi-crystalline in structure. The crystallinity increases on reheating and/or stretching of the polymer, as occurs in the production of film.

In the process of the invention, film is made from the polymer by any process known in the art. The difference between a film and a sheet is the thickness, but there is no set industry standard as to when a film becomes a sheet. For purposes of this invention, a film is ≦0.25 mm (10 mils) thick, preferably between about 0.025 mm and 0.15 mm (1 mil and 6 mils). However, thicker films can be formed up to a thickness of about 0.50 mm (20 mils).

The film of the invention is preferably formed by either solution casting or extrusion. Extrusion is particularly preferred for formation of "endless" products, such as films and sheets, which emerge as a continuous length. In extrusion, the polymeric material, whether provided as a molten polymer or as plastic pellets or granules, is fluidized and homogenized. This mixture is then forced through a suitably shaped die to produce the desired cross-sectional film shape. The extruding force may be exerted by a piston or ram (ram extrusion), or by a rotating screw (screw extrusion), which operates within a cylinder in which the material is heated and plasticized and from which it is then extruded through the die in a continuous flow. Single screw, twin screw and multi-screw extruders may be used as known in the art. Different kinds of die are used to produce different products, such as blown film (formed by a blow head for blown extrusions), sheets and strips (slot dies) and hollow and solid sections (circular dies). In this manner, films of different widths and thickness may be produced, and, in some cases, such as when film is used as a coating, it may be extruded directly onto the object to be coated. For example, wires and cables can be sheathed directly with polymeric films extruded from oblique heads. After extrusion, the polymeric film is taken up by rollers, cooled and taken off by means of suitable devices which are designed to prevent any subsequent deformation of the film.

Using extruders as known in the art, film can be produced by extruding a thin layer of polymer over chilled rolls and then further drawing down the film to size (≦0.25 mm) by tension rolls. Preferably, the finished film is ≦0.25 mm thick. Blown film, which is generally stronger, tougher, and made more rapidly than cast film, is made by extruding a tube. In producing blown film, the melt flow is turned upward from the extruder and fed through an annular die. As this tube leaves the die, internal pressure is introduced through the die mandrel with air, which expands the tube from about 1.5 to about 2.5 times the die diameter and simultaneously draws the film, causing a reduction in thickness. The resulting sleeve is subsequently slit along one side, making a larger film width than could be conveniently made via the cast film method. In extrusion coating, the substrate (paper, foil, fabric, and the like) is compressed together with the extruded polymeric melt by means of pressure rolls so that the polymer impregnates the substrate for maximum adhesion.

For manufacturing large quantities of film, a sheeting calender is employed. The rough film is fed into the gap of the calender, a machine comprising a number of heatable parallel cylindrical rollers which rotate in opposite directions and spread out the polymer and stretch it to the required thickness. The last roller smooths the film thus produced. If the film is required to have a textured surface, the final roller is provided with an appropriate embossing pattern. Alternatively, the film may be reheated and then passed through an embossing calender. The calender is followed by one or more cooling drums. Finally, the finished film is reeled up.

Alternatively, as mentioned previously, a supporting material may be coated directly with a film. For example, textile fabrics, paper, cardboard, metals, various building materials and the like, may be coated directly with the polyester polymer for the purpose of electrical insulation, protection against corrosion, protection against the action of moisture or chemicals, impermeability to gases and liquids, or increasing the mechanical strength. Coatings are applied to textiles, foil and other sheet materials by continuously operating spread-coating machines. A coating knife, such as a "doctor knife," ensures uniform spreading of the coating materials (in the form of solutions, emulsions or dispersions in water or an organic medium) on the supporting material, which is moved along by rollers. The coating is then dried. Alternatively, when the coating is applied to the supporting material in the form of a polymeric film, the process is called laminating.

Metal articles of complex shapes can also be coated with the polymeric film by means of the whirl sintering process. The articles, heated to above the melting point of the polymer, are introduced into a fluidized bed of powdered polymer wherein the powder particles are held in suspension by a rising stream of air, thus depositing a coating on the metal by sintering.

Extruded films may also be used as the starting material for other products. For example, the film may be cut into small segments for use as feed material for other processing methods, such as injection molding.

The extrusion process can be combined with a variety of post-extruding operations for expanded versatility. Such post-forming operations include altering round to oval shapes, blowing the film to different dimensions, machining and punching, biaxial stretching and the like, as known to those skilled in the art.

The polymeric film of the invention may be combined with other polymeric materials during extrusion and/or finishing to form laminates or multilayer films with improved characteristics, such as water vapor resistance. In particular, the polymeric film of the invention may be combined with one or more of the following: poly(ethylene terephthalate) (PET), aramid, polyethylene sulfide (PES), polyphenylene sulfide (PPS), polyimide (PI), polyethylene imine (PEI), polyethylene naphthalate (PEN), polysulfone (PS), polyether ether ketone (PEEK), olefins, polyethylene, poly(cyclic olefins) and cyclohexylene dimethylene terephthalate, for example. Other polymers which may be used in combination with the polyester polymer of the invention are those listed in co-pending application Ser. Nos. 09/064,826 and 09/064,720. A multilayer or laminate film may be made by any method known in the art, and may have as many as five or more separate layers joined together by heat, adhesive and/or a tie layer, as known in the art.

A film may also be formed by solution casting, which produces more consistently uniform gauge film than that made by melt extrusion. Solution casting comprises dissolving polymeric granules, powder or the like in a suitable solvent with any desired formulant, such as a plasticizer or colorant. The solution is filtered to remove dirt or large particles and cast from a slot die onto a moving belt, preferably of stainless steel, whereon the film cools. The film is then removed from the belt onto a windup roll. The extrudate thickness is five to ten times that of the finished film. The film may then be finished in a like manner to extruded film.

One of ordinary skill in the art will be able to identify appropriate process parameters based on the polymeric composition and process used for film formation.

Regardless of how the film is formed, it is desirably subjected to biaxial orientation by stretching in both the machine and transverse direction after formation. The machine direction stretch is initiated in forming the film simply by rolling out and taking up the film. This inherently stretches the film in the direction of takeup, orienting some of the fibers. Although this strengthens the film in the machine direction, it allows the film to tear easily in the direction at right angles because all of the fibers are oriented in one direction.

Therefore, biaxially stretched films are preferred. Biaxial stretching orients the fibers parallel to the plane of the film, but leaves the fibers randomly oriented within the plane of the film. This provides superior tensile strength, flexibility, toughness and shrinkability, for example, in comparison to non-oriented films. It is desirable to stretch the film along two axes at right angles to each other. This increases tensile strength and elastic modulus in the directions of stretch. It is most desirable for the amount of stretch in each direction to be roughly equivalent, thereby providing similar properties or behavior within the film when tested from any direction. However, certain applications, such as those desiring a certain amount of shrinkage or greater strength in one direction over another, as in labels or adhesive and magnetic tapes, will require uneven, or uniaxial, orientation of the fibers in the film.

The biaxial orientation may be obtained by any process known in the art. However, tentering is preferred, wherein the material is stretched while heating in the transverse direction simultaneously with, or subsequent to, stretching in the machine direction.

Shrinkage can be controlled by holding the film in a stretched position and heating for a few seconds before quenching. This heat stabilizes the oriented film, which then may be forced to shrink only at temperatures above the heat stabilization temperature.

The above process conditions and parameters for film making by any method known in the art are easily determined by a skilled artisan for any given polymeric composition and desired application.

The properties exhibited by a film will depend on several factors indicated above, including the polymeric composition, the method of forming the polymer, the method of forming the film, and whether the film was treated for stretch or biaxially oriented. These factors affect many properties of the film, such as the shrinkage, tensile strength, elongation at break, impact strength, dielectric strength and constant, tensile modulus, chemical resistance, melting point, and the like.

In particular, the amount of isosorbide incorporated into the polymeric composition directly affects the glass transition temperature ($T_g$) and dead fold properties of the film. Where isosorbide is present in an amount up to about 6.0%, preferably from about 1.0% to 3.0%, the film will retain creases and wrinkles after folding, which is particularly desirable for such applications as food wrapping. Films with about 6.0% isosorbide or higher do not exhibit these dead fold properties, and thus may be more suitable for use as coatings, labels and flexible films.

The film properties may be further adjusted by adding certain additives to the polymeric composition, such as colorants, dyes, fillers, UV and heat stabilizers, antioxidants, plasticizers, lubricants, optically active additives and the like. Fillers may include, for example, kaolin clay, calcium carbonate, silicon oxide, calcium terephthalate, aluminum oxide, titanium oxide, calcium phosphate, lithium fluoride and the like, which may be used to improve the slipperiness of the polymeric material, as may be desired for use in labels.

Alternatively, the isotropic polyester polymers of the invention may be blended with one or more other polymers, which may be formed into a film as described herein. The blend may be formed to improve certain characteristics of the inventive polymer. For example, a polyester polymer of the invention may be blended with polyethylene to improve its use as a water vapor barrier. Other polymers may be added to change such characteristics as air permeability, optical clarity, strength and/or elasticity. Suitable polymers for blending with the polyester polymer of the invention will be known to those of ordinary skill in the art. In particular, the films of the present invention may be made with the polyesters described in copending application Ser. No. 09/064,720 and the polyester blends described in copending application Ser. No. 09/064,826, the contents of each of which is hereby incorporated by reference.

The film of the invention, its manufacture and properties are further illustrated by the following non-limiting examples.

EXAMPLES

The polymer molecular weights can be estimated based on inherent viscosity (I.V.), which is measured for a 1% solution (wt./volume) of polymer in o-chlorophenol at a temperature of 25° C. The levels of catalyst components are expressed as ppm, based on a comparison of the weight of the metal with the weight of either the dimethyl terephthalate or terephthalic acid, depending on which monomer is used.

A) Polymerization

The following polymerization reactants are added to a 50 gal. maximum capacity, Hastalloy B polymerization reactor fitted with a 6" radius, Hastalloy B, water cooled reflux column packed with stainless steel rings, a stainless steel helix agitator stirrer, a water-cooled condenser and by-pass: dimethyl terephthalate (78.02 kg), isosorbide (15.42 kg), and ethylene glycol (49.90 kg), which corresponds to a mole ratio of 1:0.26:2.00. The catalyst is also charged and consists of Mn(II) acetate tetrahydrate (29.57 g), Co(II) acetate tetrahydrate (21.43 g), and Sb(III) oxide (35.02 g). This corresponds to 85 ppm manganese (weight of metal as a fraction of the weight of dimethyl terephthalate), 90 ppm cobalt, and 375 ppm antimony. The stirred reactor (50 rpm) is purged with a stream of nitrogen while the temperature is raised to 250° C. over a period of four hours. The reactor is jacketed and uses a temperature controlled, hot oil loop system as a heating medium. Methanol is continuously collected as the reaction is heated above approximately 150° C. By noting when the temperature drops at the top of the packed reflux column, it is possible to determine the end of methanol evolution, indicating the finish of the first step of the reaction, the transesterification of the diols and dimethyl terephthalate.

At this point, 77 ppm of phosphorous is added in the form of a polyphosporic acid solution in ethylene glycol. In this case, 153 ml of the solution, which has a concentration of 10.91 g per 100 g of polyphosphoric acid solution, is used. Also at this time, the nitrogen purge is stopped. Heating is continued. The reaction is heated to 285° C. over a period of about 2 hours. Vacuum is then gradually applied using a multi-vane vacuum pump with 20 horse-power blower. The attainment of full vacuum, preferably less than 1 Torr, takes approximately 1 hour. During this time, ethylene glycol distills off, and a low molecular weight polymer is formed. The molten polymer is heated under vacuum at 285° C. for about 2 hours, until the polymer achieves sufficient melt viscosity, as determined by an increase in torque of the stirrer. When sufficient viscosity is achieved, the polymerization is stopped, and the reactor is emptied through a heated die at the bottom. The molten polymer emerges as a strand that, when cooled through immersion in a cold water trough, can be chopped into pellets. The polymer pellets are dried overnight in a rotating drum heated to 120° C.

The cooled polymer is removed from the flask and ground. The solution inherent viscosity (I.V.) of the material is 0.64 dL/g.

The monomer unit composition of the polymer, determined by proton NMR, is about 6% isosorbide, 42% ethylene gylcol, 2% diethylene glycol, and 50% terephthalic acid, all expressed as a mole % of the polymer. It is noteworthy that the amount of isosorbide in the polymer is approximately half of the amount that is charged, when compared with the amount of terephthalic acid. Unreacted isosorbide is found in the distillates, especially in the ethylene glycol. The amount of isosorbide in the polymer by this process thus is very dependent on the efficiency of the distillation or other separation methods that are used in the process. A skilled practitioner can readily establish specific process details according to the characteristics of the reactor, distillation columns, and the like.

B) Film Making

The above polymer is extruded as a film using a Killion PL 100 Film extrusion line. The processing conditions are as follows:

| Extruder Barrel Temperature: | |
| --- | --- |
| zone 1 | 180° C. |
| zone 2 | 220° C. |
| zone 3 | 240° C. |
| zone 4 | 240° C. |
| Clamp ring temperature | 240° C. |
| Adaptor temperature (inlet) | 230° C. |
| Melt pump temperature | 230° C. |
| Melt pump rpm | 10 |
| Throughput | 3 lb/hr |
| Adaptor temperature (outlet) | 220° C. |
| Extruder melt pressure | ~1500 psi |
| Die adaptor temperature | 220° C. |
| Die temperature | 220° C. |
| Die Lip temperature | 220° C. |
| Die gap | 0.25 mm (10 mil) |
| Die size | 4-inch |
| Casting temperature | 50° C. |
| Casting speed | 5 & 3 m/min |
| Filter size | 25 microns |

The film exiting the die is 4 inches wide and 0.10 mm (4 mils) thick. The physical properties of the film are given in Table 1.

TABLE 1

| Film (0.10 mm) | | ASTM test |
| --- | --- | --- |
| Tg(°C.) | 95 | Differential scanning calorimetry |
| tensile modulus(Mpsi) | 0.286 | D882 |
| tensile elongation at break (%) | 3.9 | D882 |
| tensile strength(kpsi) | 8.1 | D882 |
| dielectric strength(volts/mil) | 2872 | D149 |
| dielectric constant | 3.7 | D150T |
| $O_2$ barrier cc.mm/m2-day-atm | 8.4 | Mocon OX-Tran 2/20 (Minn. MN) |
| refractive index @ 633 nm | | Abbe refractometer |
| machine direction | 1.575 | " |
| 90° to MD in plane | 1.5737 | " |
| out of plane | 1.5723 | " |

C) Film Stretching

The extruded film is stretched uniaxially and biaxially using a modified Bruckner Stretching Frame (Bruckner, Siegsdorf, Germany). The sample is inserted with the machine direction (MD) on the Y axis of the machine. Draw speed is 1.50 in./sec. Table 2 describes the draw ratios, machine temperatures, and conditions of the stretching, as well as the mechanical properties measured according to ASTM 882.

It is to be understood that the above described embodiments are illustrative only and that modifications may occur to one skilled in the art. Accordingly, this invention is not limited to the embodiments disclosed herein.

TABLE 2

| Example (4 mils) | Stretching Conditions | Plaque Preheat Temp (° C.) | Shutter Close Temp (° C.) | Emitter Temp (° C.) | Draw Ratio X (×100%) | Draw Ratio Y (×100%) | Modulus (Mpsi) | Elongation at Break (%) | Strength (Kpsi) |
| --- | --- | --- | --- | --- | --- | --- | --- | --- | --- |
| Comp. Ex. | unstretched film | 110 | 115 | 600 | 1 | 1 | 0.286 | 3.9 | 8.1 |
| Ex. 1 | change emitter temp. | 110 | 115 | 600 | 1 | 2 | 0.32 | 44.7 | 7 |
| Ex. 2 | chg. draw ratio | 110 | 115 | 600 | 1 | 1.5 | 0.28 | 5.22 | 6.1 |

What is claimed is:

1. A film comprising a polyester, wherein said polyester comprises terephthaloyl moieties; optionally, one or more other aromatic diacid moieties; ethylene glycol moieties; isosorbide moieties; and, optionally, one or more other diol moieties, wherein said polyester has an inherent viscosity of at least about 0.35 dL/g when measured as a 1% (weight/volume) solution of said polyester in o-chlorophenol at a temperature of 25° C.

2. The film according to claim 1, wherein said terephthaloyl moieties are derived from terephthalic acid or dimethyl terephthalate.

3. The film according to claim 1, wherein the polyester further comprises diethylene glycol moieties.

4. The film according to claim 1, wherein said one or more other diol moieties are derived from aliphatic alkylene glycols or branched aliphatic glycols having from 3–12 carbon atoms and having the empirical formula HO—$C_nH_{2n}$—OH, where n is an integer from 3–12; cis or trans-1,4-cyclohexanedimethanol or mixtures thereof; triethylene glycol; 2,2-bis[4-(2-hydroxyethoxy)phenyl] propane; 1,1-bis[4-(2-hydroxyethoxy)phenyl]cyclohexane; 9,9-bis[4-(2-hydroxyethoxy)-phenyl]fluorene; 1,4:3,6-dianhydromannitol; 1,4:3,6-dianhydroiditol; or 1,4-anhydroerythritol.

5. The film according to claim 4, wherein said one or more other diol moieties are derived from cis-1,4- cyclohexanedimethanol, trans-1,4-cyclohexanedimethanol, or mixtures thereof.

6. The film according to claim 1, wherein said one or more other aromatic diacid moieties are derived from isophthalic acid, 2,5-furandicarboxylic acid, 2,5-thiophenedicarboxylic acid, 2,6-naphthalenedicarboxylic acid, 2,7-naphthalenedicarboxylic acid, or 4,4'-bibenzoic acid.

7. The film according to claim 6, wherein said one or more other aromatic diacid moieties are derived from isophthalic acid, 2,6-naphthalenedicarboxylic acid, 4,4'-bibenzoic acid, or mixtures thereof.

8. The film according to claim 1, wherein said inherent viscosity is from about 0.45 to 1.0 dL/g.

9. The film according to claim 8, wherein said inherent viscosity is from about 0.50 dL/g to 0.70 dL/g.

10. The film according to claim 1, wherein said terephthaloyl moieties are present in an amount of from about 40 to 50 mole % of said polyester, said one or more other aromatic diacid moieties are present in an amount of from about 0.1 to 10.0 mole % of the polyester, said ethylene glycol moieties are present in an amount of from about 33 to 49.9 mole % of said polyester, said isosorbide moieties are present in an amount of from about 0.25 to 20.0 mole % of said polyester, and said one or more other diol moieties are present in an amount of up to about 2.0 mole % of said polyester.

11. The film according to claim 10, wherein said one or more other diol moieties comprise diethylene glycol moieties in an amount up to about 5.0 mole % of said polyester.

12. The film according to claim 10, wherein said isosorbide moieties are present in an amount of from about 6.0–12.0%.

13. The film according to claim 12, wherein said isosorbide moieties are present in an amount of from about 1.0–3.0%.

14. The film according to claim 13, wherein the film has dead fold properties.

15. The film according to claim 1, having a thickness less than or equal to 0.25 mm.

16. The film according to claim 1, being biaxially stretched.

17. A method of making a film, wherein the film comprises a polyester, said method comprising:
    a) forming the polyester; and
    b) making the polyester into a film;
    wherein the polyester comprises terephthaloyl moieties; optionally, one or more other diacid moieties; ethylene glycol moieties; isosorbide moieties; and, optionally, one or more other diol moieties, wherein said polyester has an inherent viscosity of at least about 0.35 dL/g when measured as a 1% (weight/volume) solution of said polyester in o-chlorophenol at a temperature of 25° C.

18. The method according to claim 17, wherein forming the polyester comprises:
    (a) combining in a reactor a monomer comprising a terephthaloyl moiety; optionally, one or more other monomers comprising an aromatic diacid moiety; a monomer comprising an ethylene glycol moiety; a monomer comprising an isosorbide moiety; and optionally, one or more other monomers comprising a diol moiety with a condensation catalyst suitable for condensing diacids and glycols; and
    (b) heating said monomers and said catalyst to a temperature sufficient to polymerize said monomers into a polyester polymer having at least the terephthaloyl moieties, ethylene glycol moieties and isosorbide moieties,
    wherein said heating is continued for a sufficient time to yield a polyester having an inherent viscosity of at least about 0.35 dL/g when measured as a 1% (weight/volume) solution of said polyester in o-chlorophenol at a temperature of 25° C.

19. The method according to claim 18, wherein heating said monomers further includes stirring said monomers with the concurrent removal of by-products by distillation and/or evaporation.

20. The method according to claim 18, wherein said monomer comprising a terephthaloyl moiety is terephthalic acid.

21. The method according to claim 20, wherein water and unreacted monomer are removed while said monomers polymerize.

22. The method according to claim 18, wherein said monomer comprising a terephthaloyl moiety is dimethyl terephthalate.

23. The method according to claim 22, wherein methanol and unreacted monomer are removed while said monomers polymerize.

24. The method according to claim 17, wherein said one or more other monomers comprising a diol moiety is selected from the group consisting of aliphatic alkylene glycols and branched aliphatic glycols having from 3–12 carbon atoms and having the empirical formula HO—$C_nH_{2n}$—OH, where n is an integer from 3–12; cis and trans-1,4-cyclohexanedimethanol and mixtures thereof; triethylene glycol; 2,2-bis[4-(2-hydroxyethoxy)phenyl]propane; 1,1-bis[4-(2-hydroxyethoxy) phenyl]cyclohexane; and 9,9-bis[4-(2-hydroxyethoxy)phenyl]fluorene.

25. The method according to claim 17, wherein said one or more other monomers comprising other aromatic or alicyclic diacid moieties are selected from the group consisting of isophthalic acid, 2,5-furandicarboxylic acid, 2,5-thiophenedicarboxylic acid, 2,6-naphthalenedicarboxylic acid, 2,7-naphthalenedicarboxylic acid, and 4,4'-bibenzoic acid.

26. The method according to claim 18, wherein said terephthaloyl moieties are present in an amount of about 40 to about 50 mole % of said polyester, said one or more other diacid moieties are present in an amount up to about 10 mole % of said polyester, said ethylene glycol moieties are present in an amount of about 33 to about 49.9 mole % of the polyester, said isosorbide moieties are present in an amount of about 0.25 to about 20.0 mole % of said polyester, and said one or more other diol moieties are present in an amount up to about 2.0 mole % of said polyester.

27. The method according to claim 17, wherein said one or more other diol moieties are diethylene glycol moieties in an amount of up to about 5.0 mole % of said polyester.

28. The method according to claim 27, wherein said isosorbide moieties are present in an amount of from about 6.0 to 12.0% of said polyester.

29. The method according to claim 28, wherein said isosorbide moieties are present in an amount of from about 1.0 to 3.0% of said polyester.

30. The method according to claim 17, wherein the film has a thickness less than or equal to 0.25 mm.

31. The method according to claim 17, wherein the film is biaxially stretched.

32. The method according to claim 17, further comprising increasing the molecular weight of said polyester by solid state polymerization.

33. The method according to claim 32, wherein said solid state polymerization comprises:
    (a) crystallizing said polyester by heating said polyester at a temperature in the range of about 115° C. to about 140° C.; and (b) heating said polyester under vacuum or in a stream of inert gas at an elevated temperature above 140° C. but below the melting temperature of said polyester to yield a polyester having an increased inherent viscosity.

34. The method according to claim 33, wherein said heating step (b) is carried out at a temperature of about 195° to 198° C. for about 10 hours.

35. The method according to claim 33, wherein said increased inherent viscosity is at least about 0.65 dL/g.

36. The method according to claim 17, wherein making said polyester into a film comprises:

a) melting said polyester;

b) extruding said molten polyester; and c) cooling said extruded polyester, thereby forming a film.

37. An article made from the film of claim 1.

38. The article according to claim 37, wherein the article is selected from the group consisting of a label, an insulator, a coating, a capacitor, a laminate, a photographic film, an x-ray film, and a tape.

39. The article according to claim 37, wherein the film is from about 0.025–0.15 mm.

40. The article according to claim 37, wherein the film is biaxially stretched.

41. The article according to claim 37, wherein the film has dead fold properties.

* * * * *